United States Patent [19]

McNaul

[11] 4,250,506
[45] Feb. 10, 1981

[54] SIDELOBE DISCRIMINATOR

[75] Inventor: William F. McNaul, Escondido, Calif.

[73] Assignee: Cubic Corporation, San Diego, Calif.

[21] Appl. No.: 75,143

[22] Filed: Sep. 12, 1979

[51] Int. Cl.³ .............................................. H04B 7/00
[52] U.S. Cl. ................................ 343/100 CS; 343/754
[58] Field of Search .................. 343/100 LE, 100 CL, 343/100 CS, 754; 325/323, 324, 472, 39, 59, 60; 179/15 AN

[56] References Cited

U.S. PATENT DOCUMENTS

| | | | |
|---|---|---|---|
| 3,276,023 | 9/1966 | Dorne et al. | 343/754 |
| 3,453,629 | 7/1969 | Stahler et al. | 343/754 |
| 3,708,796 | 1/1973 | Gilbert | 343/754 |

*Primary Examiner*—Theodore M. Blum
*Attorney, Agent, or Firm*—Brown & Martin

[57] ABSTRACT

A system for discriminating between signals arriving on the mainbeam of a collecting antenna and signals arriving on the sidelobes of the antenna is disclosed. The system includes a variable scatterer coupled to a collecting antenna for variably scattering the sidelobes of the antenna; a signal driver for providing a modulation signal having a predetermined modulation pattern, wherein the signal driver is coupled to the variable scatterer for variably scattering the sidelobes in response to the modulation signal to thereby cause signals arriving on the sidelobes to have the predetermined modulation pattern; a receiver coupled to the antenna for providing received signals in response to signals arriving on the mainbeam and signals arriving on the sidelobes of the antenna; and a detector coupled to the receiver and the signal driver, wherein the detector is responsive to the modulation signal for detecting the received signals having the predetermined modulation pattern, to thereby discriminate the detected signals as being received from signals arriving on the sidelobes and for providing an identification signal to indicate whether the received signal is coincident with signals arriving on the sidelobes of the collecting antenna. A corresponding system for discriminating between signals transmitted on the mainbeam and sidelobes of a transmitting antenna also is disclosed.

25 Claims, 7 Drawing Figures

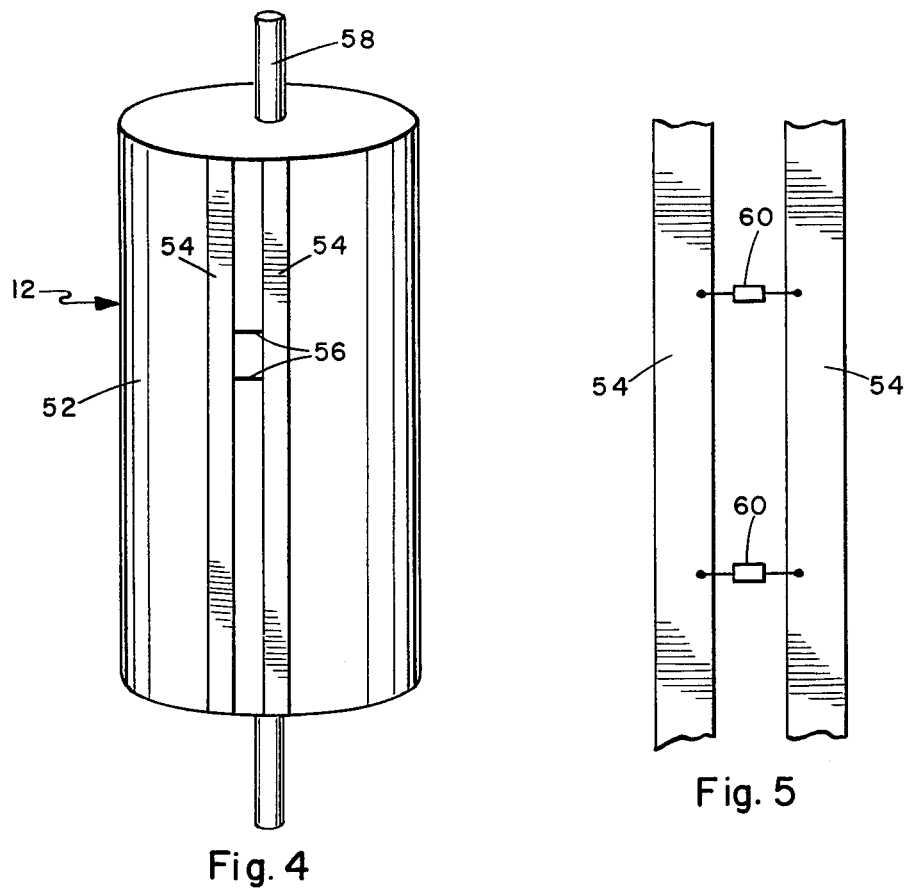
Fig. 4
Fig. 5
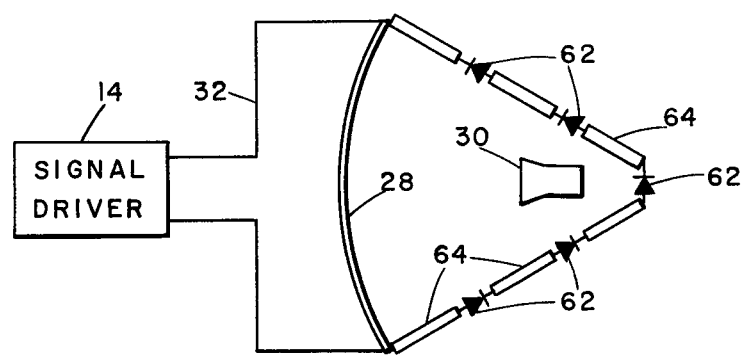
Fig. 6

SIDELOBE DISCRIMINATOR

BACKGROUND OF THE INVENTION

The present invention generally pertains to antenna systems and is particularly directed to a system for discriminating between signals arriving on the mainbeam of a collecting antenna and signals arriving on the sidelobes of the antenna.

A communications receiver coupled to a collecting antenna receives signals that arrive on either the mainbeam or the sidelobes of the antenna. It is important to be able to discriminate between the signals arriving on the mainbeam and the signals arriving on the sidelobes. This is particularly true in a communications system wherein the antenna is designed to track the direction of arrival of the signal received on the mainbeam. Although the magnitude of the mainbeam signals are usually sufficiently greater than the magnitude of the sidelobe signals to enable discrimination between the respective received signals based upon their relative magnitudes, in some communication systems and/or environments the magnitudes of the respective received signals are not sufficiently different to enable reliable discrimination between them.

SUMMARY OF THE INVENTION

The present invention enables signals arriving on the sidelobes of a collecting antenna to be discriminated from the signals arriving on the mainbeam of the antenna without regard for the relative magnitudes of these signals.

The present invention utilizes a known characteristic of antennas, that the details of the sidelobe structure of a given collecting antenna are quite sensitive to the presence of small scattering objects in or near the aperture of the antenna; whereas the effects on the mainbeam of small scattering objects in or near the aperture is relatively negligible.

By introducing a rapidly varying change in the scattering objects in or near the aperture of the collecting antenna, the sidelobe structure can be made to vary quite rapidly. This variation or modulation of the sidelobe introduces a predetermined modulation pattern in signals arriving on the sidelobes that are received by the receiver coupled to the antenna that can be used to discriminate between sidelobe signals and mainbeam signals. Since the effects on the mainbeam of an antenna of small scattering objects in the aperture is negligible compared to the effects on the sidelobe structure, the detection of received signals having the predetermined modulation pattern identifies the detected signals as being received from signals arriving on the sidelobes.

In essence, the sidelobe discrimination system of the present invention includes a variable scatterer coupled to a collecting antenna for variably scattering the sidelobes of the antenna; a signal driver for providing a modulation signal driver is coupled to the variable scatterer for variably scattering the sidelobes in response to the modulation signal to thereby cause signals arriving on the sidelobes to have the predetermined modulation pattern; a receiver coupled to the antenna for providing received signals in response to signals arriving on the mainbeam and signals arriving on the sidelobes of the antenna; and a detector coupled to the receiver and the signal driver, wherein the detector is responsive to the modulation signal for detecting the received signals having the predetermined modulation pattern, to thereby discriminate the detected signals as being received from signals arriving on the sidelobes and for providing an identification signal to indicate whether the received signal is coincident with signals arriving on the sidelobes of the collecting antenna.

The present invention also provides a corresponding system and method for discriminating between signals transmitted on the mainbeam of a transmitting antenna and signals transmitted on the sidelobes of the antenna.

The present invention is applicable to communication systems utilizing infrared or acoustic radiation as well as to systems utilizing electromagnetic radiation.

BRIEF DESCRIPTION OF THE DRAWING

FIG. 4 illustrates a preferred embodiment of a variable scatterer included in the sidelobe discrimination system of FIG. 1, as shown in FIGS. 2A and 2B.

FIG. 5 is a view of an alternative embodiment of a portion of a variable scatterer such as shown in FIG. 4, but drawn to a larger scale than FIG. 4.

FIG. 6 illustrates another preferred embodiment of a variable scatterer included in the sidelobe discriminator system of FIG. 1.

DESCRIPTION OF THE PREFERRED EMBODIMENTS

Figure 1:
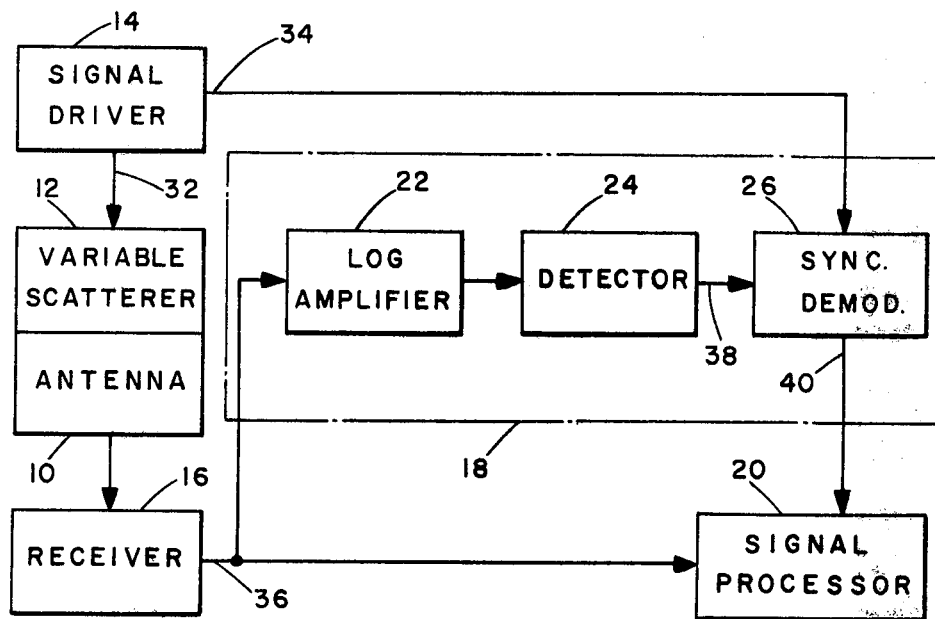
FIG. 1 is a block diagram of a preferred embodiment of the sidelobe discrimination system of the present invention.

Referring to FIG. 1, a preferred embodiment of the sidelobe discriminator system of the present invention includes an RF antenna 10, a variable scatterer 12, a signal driver 14, a receiver 16, a detector system 18, and a signal processor 20. The detector system 18 includes a log amplifier 22 coupled to the output of the receiver 16, a detector 24 coupled to the output of the amplifier 22 and a synchronous demodulator 26 coupled to the output of the signal driver 14 and to the output of the detector 24.

Figure 2A:
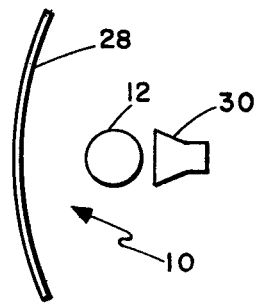
FIGS. 2A and 2B are side and front schematic views respectively, showing a preferred relative placement of the variable scatterer and the antenna in the system of FIG. 1.
Figure 2B:
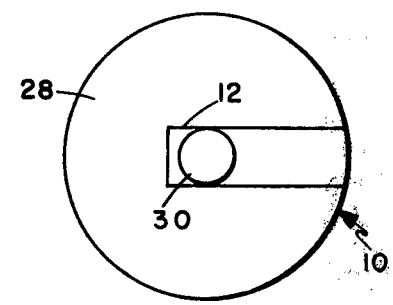

Referring to FIGS. 2A and 2B, the antenna 10 includes a reflector 28 and a feed assembly 30. The variable scatterer 12 is located in the aperture of the antenna 10. The variable scatterer 12 includes a number of small scatterers.

In alternative embodiments, variable scattering may be accomplished by varying the position, size or other parameter of the scattering objects. Several different kinds of scatterers can be used. One preferred embodiment of a variable scatterer useful in the system of the present invention is the combination of a long wire with PIN diodes switches connected at various lengths of the wire. By opening or closing the PIN diode switches the scattering characteristics of the wire can be made to vary at a frequency up to several hundred megahertz.

Another preferred embodiment of a variable scatterer 12 is shown in FIG. 4. This embodiment includes a styrofoam cylinder 52 having longitudinal copper strips 54 mounted on the outside surface of the cylinder parallel to the axis of the cylinder, and a pair of bus wires 56 connected between the conductors 54 as shown in FIG. 4. The cylinder 52 is rotatably mounted on an axel 58.

The variable scatterer 12 of FIG. 4 is located in the aperture of the antenna 10 as shown in FIG. 2. The variable scatterer of FIG. 4 may be used to scatter the sidelobes to have the predetermined modulation pattern by rotating the cylinder 52 with a motor (not shown) in response to the modulation signal supplied on line 32 by the signal driver 14.

In an alternative embodiment, the bus wires 56 are replaced by PIN diodes 60, as shown in FIG. 5, and instead of rotating the cylinder 52, the PIN diodes 60 are switched open and closed in response to the modulation signal on line 32 from the signal driver.

Still another preferred embodiment of a variable scatterer 12 in combination with an antenna 10 is shown in FIG. 6. A plurality of PIN diodes 62 are interconnected in series with a plurality of metal rods 64 that extend from the edges of an antenna reflector 28 to a common point behind an antenna feed assembly 30. The series-connected elements are connected to a signal driver 14, which provides a modulation signal on line 32 for forward and reverse biasing of the PIN diodes in accordance with a predetermined modulation pattern. The sidelobes of the antenna 10 are thereby electronically scattered.

The field strength associated with the scattered energy is intended to be comparable to the field strength associated with the sidelobes of the antenna.

In the preferred embodiment shown in FIG. 1, the signal driver 14 provides a modulation signal on lines 32 and 34 having a predetermined modulation pattern. Various types of modulation schemes may be utilized, such as amplitude, phase, frequency, etc. In the preferred embodiment described herein the modulation signal on lines 32 and 34 has the predetermined modulation pattern shown in FIG. 3A. The variable scatterer 12 is coupled to the signal driver 14 for variably scattering the sidelobes of the antenna 10 in response to the modulation signal on line 32 to thereby cause signals arriving on the sidelobes to have the predetermined modulation pattern.

The receiver 16 is coupled to the antenna 10 for providing received signals on line 36 in response to signals arriving on the mainbeam and the sidelobes of the antenna 10. The waveform of the received signal on line 36 is shown in FIG. 3B, with signal pulse 42 being derived from the sidelobe and signal pulse 44 being derived from the mainbeam.

Detection of the predetermined modulation pattern in the signals on line 36 is accomplished quite readily using conventional circuitry and filters provided that the predetermined modulation pattern on the sidelobes has a peak to peak variation that is appreciably greater than the peak to peak variation of the modulation pattern of the communication signal arriving on the mainbeam of the antenna.

Figure 3:
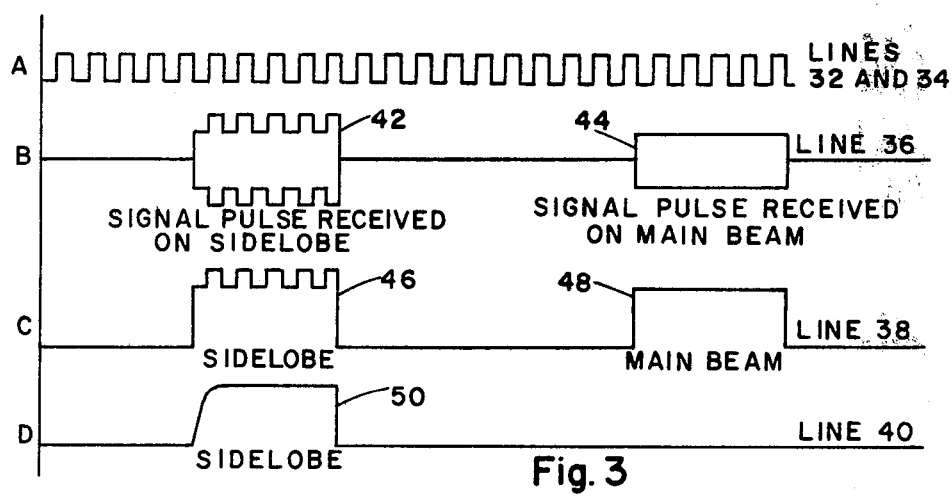
FIGS. 3A, 3B, 3C and 3D illustrate various waveforms produced in the system of FIG. 1.

In the detector system 18, the received signal on line 36 is amplified by the log amplifier 22, and the modulation pattern of the signal on line 36 is detected by the detector 24 to provide a signal on line 38 having a waveform such as that shown in FIG. 3C, wherein signal pulse 46 is derived from the sidelobe and signal pulse 48 is derived from the mainbeam. The synchronous demodulator 26 receives the signal on line 38 and responds to the modulation signal on line 34 to detect whether or not the signal on line 38 has the predetermined modulation pattern. If the signal on line 38 has the predetermined modulation pattern, the synchronous detector provides a flag identification signal pulse 50 on line 40, such as shown in FIG. 3D.

The signal on line 40 is provided to the signal processor 20 to indicate whether the received signal provided to the signal processor via line 36 is received from signals arriving on the sidelobes.

The detector system 18 is merely exemplary. Other systems are well known to those skilled in the art for detecting received signals having the predetermined modulation pattern and thereby discriminating the detected signals as being received from signals arriving on the sidelobes.

The present invention also provides a system and method for discriminating between signals transmitted on the mainbeam of a transmitting antenna and signals transmitted on the sidelobes of the transmitting antenna.

Referring to FIG. 1, the antenna 10 is used as a transmitting antenna and is combined with the variable scatterer 12 in the same manner as in the embodiment of FIG. 1. The signal driver 14 is combined with the variable scatterer 12 in the same manner as in the embodiment of FIGS. 1 and 5 to cause signals transmitted on the sidelobes to have a predetermined modulation pattern. The receiver 16 is not coupled to the antenna 10, nor is the signal driver coupled to the detector system 16. Instead the receiver is coupled to a collecting antenna (not shown) for providing received signals on line 36 in response to the mainbeam and sidelobe signals transmitted by the antenna 10. Also a reference signal, such as shown in FIG. 3A is generated internally within the synchronous demodulator 26 of the detector system 18 for enabling detection of signals on line 36 having the predetermined modulation pattern.

In other respects the receiver 16, detector system 18 and signal processor are combined in the same manner as in the embodiment of FIG. 1 for discriminating detected signals as received from signals transmitted on the sidelobes.

I claim:

1. A system for discriminating between signals arriving on the mainbeam of a collecting antenna and signals arriving on the sidelobes of the antenna, comprising a variable scatterer coupled to a collecting antenna for variably scattering said sidelobes of said antenna;

a signal driver for providing a modulation signal having a predetermined modulation pattern, wherein the signal driver is coupled to the variable scatterer for variably scattering said sidelobes in response to said modulation signal to thereby cause signals arriving on said sidelobes to have said predetermined modulation pattern;

a receiver coupled to said antenna for providing received signals in response to signals arriving on the mainbeam and signals arriving on the sidelobes of said antenna; and a detector coupled to the receiver and the signal driver, wherein the detector is responsive to said modulation signal for detecting said received signals having said predetermined modulation pattern, to thereby discriminate said detected signals as being received from signals arriving on sid sidelobes, and for providing an identification signal to indicate whether the received signal is coincident with signals arriving on the sidelobes of the collecting antenna.

2. A system according to claim 1, further comprising a said collecting antenna.

3. A system according to claim 1 or 2, wherein the variable scatterer is in the aperture of said antenna.

4. A system according to claim 1, further comprising a signal processor coupled to the receiver and the detector for processing signals from the receiver in response to the identification signal.

5. A method of discriminating between signals arriving on the mainbeam of a collecting antenna and signals arriving on the sidelobes of the antenna, comprising the steps of
   (a) variable scattering said sidelobes of said antenna to cause signals arriving on said sidelobes to have a predetermined modulation pattern;
   (b) providing received signals in response to signals arriving on the mainbeam and signals arriving on the sidelobes of said antenna;
   (c) detecting said received signals having said predetermined modulation pattern, to thereby discriminate said detected signals as being received from signals arriving on said sidelobes; and
   (d) providing an identification signal in response to said detection for indicating whether the received signal is coincident with signals arriving on the sidelobes of the collecting antenna.

6. A method according to claim 5, wherein step (a) comprises:
   driving a variable scatterer with a modulation signal having said predetermined modulation pattern.

7. A method according to claim 6, wherein step (a) comprises:
   locating the variable scatterer in the aperture of said antenna.

8. A method according to claim 5 further comprising the step of:
   (e) processing received signals in response to the identification signal.

9. A system for discriminating between signals arriving on the mainbeam of a collecting antenna and signals arriving on the sidelobes of the antenna, comprising
   means for modulating signals arriving on said sidelobes to have a predetermined modulation pattern;
   a receiver for providing received signals in response to signals arriving on the mainbeam and said modulated signals arriving on said sidelobes; and
   a detector coupled to the receiver for detecting said received signals having said predetermined modulation pattern, to thereby discriminate said detected signals as being received from signals arriving on said sidelobes, and for providing an identification signal to indicate whether the received signal is coincident with signals arriving on the sidelobes of the collecting antenna.

10. A system according to claim 9 further comprising a signal processor coupled to the receiver and the detector for processing signals from the receiver response to the identification signal.

11. A method of discriminating between signals arriving on the mainbeam of a collecting antenna and signals arriving on the sideloves of the antenna, comprising the steps of
   (a) modulating signals arriving on said sidelobes to have a predetermined modulation pattern;
   (b) providing received signals in response to signals arriving on the mainbeam and said modulated signals arriving on said sidelobes;
   (c) detecting said received signals having said predetermined modulation pattern, to thereby discriminate said detected signals as being received from signals arriving on said sidelobes; and
   (d) providing an identification signal in response to said detection for indicating whether the received signal is coincident with signals arriving on the sidelobes of the collecting antenna.

12. A method according to claim 11 further comprising the step of:
   (e) processing received signals in response to the identification signal.

13. A system for discriminating between signals transmitted on the mainbeam of a transmitting antenna and signals transmitted on the sidelobes of the antenna, comprising
   a variable scatterer coupled to a transmitting antenna for variably scattering said sidelobes of said antenna;
   a signal driver for providing a modulation signal having a predetermined modulation pattern, wherein the signal driver is coupled to the variable scatterer for variably scattering said sidelobes in response to said modulation signal to thereby cause signals transmitted on said sidelobes to have said predetermined modulation pattern;
   a receiver coupled to a collecting antenna for providing received signals in response to signals transmitted on the mainbeam and the sidelobes of said transmitting antenna; and
   a detector coupled to the receiver for detecting said received signals having said predetermined modulation pattern, to thereby discriminate said detected signals as being received from signals transmitted on said sidelobes, and for providing an identification signal to indicate whether the received signal is coincident with signals transmitted on the sidelobes of the transmitting antenna.

14. A system according to claim 13, further comprising a said transmitting antenna.

15. A system according to claims 13 or 14 wherein the variable scatterer is in the aperture of said transmitting antenna.

16. A system according to claims 13 or 14, further comprising a said collecting antenna.

17. A system according to claim 13, further comprising
   a signal processor coupled to the receiver and the detector for processing signals from the receiver response to the identification signal.

18. A method of discriminating between signals transmitted on the mainbeam of a collecting antenna and signals transmitted on the sidelobes of the antenna, comprising the steps of
   (a) variably scattering said sidelobes of said antenna to cause signals transmitted on said sidelobes to have a predetermined modulation pattern;
   (b) providing received signals in response to signals transmitted on the mainbeam and the sidelobes of said antenna;
   (c) detecting said received signals having said predetermined modulation pattern, to thereby discriminate said detected signals as being received from signals transmitted on said sidelobes; and
   (d) providing an identification signal in response to said detection for indicating whether the received signal is coincident with signals transmitted on the sidelobes of the transmitting antenna.

19. A method according to claim 18, wherein step (a) comprises driving a variable scatterer with a modulation signal having said predetermined modulation pattern.

20. A method according to claim 19, wherein step (a) comprises locating the variable scatterer in the aperture of said antenna.

21. A method according to claim 18, further comprising the step of:

(e) processing received signals in response to the identification signal.

22. A system for discriminating between signals and transmitted on the mainbeam of a transmitting antenna and signals transmitted on the sidelobes of the antenna, comprising means for modulating signals transmitted on said sidelobes to have a predetermined modulation pattern;

a receiver for providing received signals in response to signals transmitted on the mainbeam and said modulated signals transmitted on said sidelobes; and a detector coupled to the receiver for detecting said received signals having said predetermined modulation pattern, to thereby discriminate said detected signals as being received from signals transmitted on said sidelobes, and for providing an identification signal to indicate whether the received signal is coincident with signals transmitted on the sidelobes of the transmitting antenna.

23. A system according to claim 22, further comprising a signal processor coupled to the receiver and the detector for processing signals from the receiver in response to the identification signal.

24. A method of discriminating between signals transmitted on the mainbeam of a transmitting antenna and signals transmitted on the sidelobes of the antenna, comprising the steps of (a) modulating signals transmitted on said sidelobes to have a predetermined modulation pattern;

(b) providing received signals in response to signals transmitted on the mainbeam and said modulated signals transmitted on said sidelobes;

(c) detecting said received signals having said predetermined modulation pattern, to thereby discriminate said detected signals as being received from signals transmitted on said sidelobes; and (d) providing an identification signal in response to said detection for indicating whether the received signal is coincident with signals transmitted on the sidelobes of the transmitting antenna.

25. A method according to claim 24, further comprising the step of:

(e) processing received signals in response to the identification signal.

* * * * *